Patented Dec. 5, 1939

2,182,518

UNITED STATES PATENT OFFICE 2,182,518

THIOBARBITURIC ACIDS

Arthur W. Dox, Windsor, Ontario, Canada, assignor to Parke Davis & Company, Detroit, Mich., a corporation of Michigan No Drawing. Application January 16, 1939, Serial No. 251,256

4 Claims. (Cl. 260—260)

The invention relates to 5-5 di-substituted thiobarbituric acid compounds.

This application is a continuation in part of my copending application, Serial No. 715,998, filed March 16, 1934.

The invention in the present application relates more particularly to thiobarbituric acid compounds where one of the substituents is a phenyl radical and the other substituent is a saturated or unsaturated alkyl radical having up to 7 carbon atoms. Such compounds may be represented by the formula

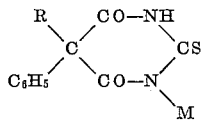

where R is an alkyl radical having not more than 7 carbon atoms and M is hydrogen or a salt-forming basic group capable of replacing the hydrogen of the imino group.

By the above expression "salt-forming basic group capable of replacing the hydrogen of the imino group" is meant groups such as ammonium, alkali metals such as potassium, sodium, rubidium, ceasium, alkaline earth metals such as calcium, strontium and barium, including magnesium. These groups are well known as characteristic groups for the replacement of the imino hydrogen of barbituric and thiobarbituric acids to form salts.

Typical examples of the compounds of the invention are:

Ethyl phenyl thiobarbituric acid
Allyl phenyl thiobarbituric acid
n-Propyl phenyl thiobarbituric acid
Iso-propyl phenyl thiobarbituric acid
Butyl phenyl thiobarbituric acid
Amyl phenyl thiobarbituric acid
Iso-amyl phenyl thiobarbituric acid All of the above thiobarbituric acids can be converted to their salts whether soluble or insoluble by neutralizing with the proper amount of salt-forming base. Thus the invention includes the alkali metal, alkaline earth metal, magnesium or ammonium salts of the new group of thiobarbituric acids.

The above and other compounds of the invention are made by methods well known for the preparation of barbituric acids and are analogous to those given in detail under the examples set forth in my parent application, Serial No. 715,998, filed March 16, 1934, above referred to. Therefore I will give only one illustrative example, namely, that for the preparation of ethyl phenyl thiobarbituric acid and its sodium salt.

*Example—Ethyl phenyl thiobarbituric acid*

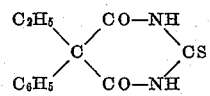

5.1 grams of thiourea are dissolved by warming in 50 cc. of ethyl alcohol containing 3.1 grams of sodium. 12.0 grams of ethyl phenyl diethyl malonic ester are added to the alcoholic solution. The mixture is evaporated and then dissolved in water and the crude ethyl phenyl thiobarbituric acid precipitated by adding hydrochloric acid until the solution becomes neutral. The crystals form readily and may be recrystallized by dissolving them in hot ethyl alcohol, filtering the alcoholic solution and diluting the filtrate with one-half volume of water. After standing, the crystals of pure ethyl phenyl thiobarbituric acid are filtered from the aqueous alcoholic solution in the form of pale yellow shiny scales having a melting point when dry of 218° C.

The sodium salt of ethyl phenyl thiobarbituric acid is obtained by dissolving a weighed quantity of the same in the exact chemical equivalent of a sodium hydroxide solution, the solution filtered, and the filtrate evaporated down to a dry solid which can be easily pulverized into a readily water- and alcohol-soluble powder.

The new compounds of this invention are of value as intermediates for the preparation of other chemical substances, and many of the compounds are valuable for their therapeutic properties. For example, the compounds have value as hypnotics, sedatives, anesthetics, are useful in the treatment of epilepsy and have other medical and pharmaceutical uses.

The thiobarbituric acids of this invention may be reacted with basic substances, such as amines, to form substituted ammonium salts which, for many purposes, are the equivalent of the ammonium salts and as such are included within the scope of the invention. The new salts of the acids may also be reacted chemically to produce further new and useful compositions which may or may not be of value in the narrow pharmaceutical or medical sense. In other words, the invention is not limited to compounds having hypnotic properties but in the broad sense covers a new group of chemical individuals having certain common characteristics as already described and as defined by the claims appended hereto.

What I claim as my invention is:
1. A compound having the formula

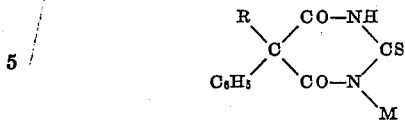

where R is an alkyl radical having not more than 7 carbon atoms and M is a member of the class consisting of hydrogen and a salt-forming basic group capable of replacing the hydrogen of the imino group.

2. An ethyl phenyl thiobarbiturate.
3. Ethyl phenyl thiobarbituric acid.
4. The sodium salt of ethyl phenyl thiobarbituric acid.

ARTHUR W. DOX.